United States Patent
Arikara et al.

(10) Patent No.: US 7,968,236 B2
(45) Date of Patent: *Jun. 28, 2011

(54) FORCED AIR FUEL CELL POWER SYSTEM

(75) Inventors: Muralidharan P. Arikara, Folsom, CA (US); Lawrence B. Bawden, El Dorado Hills, CA (US); Kenneth E. Pearson, Shingle Springs, CA (US); Glenn M. Dunn, Fair Oaks, CA (US)

(73) Assignee: Jadoo Power Systems Inc., Folsom, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/725,411

(22) Filed: Mar. 16, 2010

(65) Prior Publication Data

US 2010/0291454 A1    Nov. 18, 2010

Related U.S. Application Data

(60) Continuation of application No. 11/827,061, filed on Jul. 9, 2007, now Pat. No. 7,678,482, which is a division of application No. 10/328,709, filed on Dec. 24, 2002, now Pat. No. 7,241,523.

(60) Provisional application No. 60/345,855, filed on Jan. 4, 2002.

(51) Int. Cl.
  *H01M 8/00*    (2006.01)
(52) U.S. Cl. ......... 429/400; 429/428; 429/434; 429/443
(58) Field of Classification Search .................. 429/400, 429/428, 434, 443
  See application file for complete search history.

(56) References Cited

U.S. PATENT DOCUMENTS

| | | |
|---|---|---|
| 3,629,075 A | 12/1971 | Gutbier |
| 5,229,222 A | 7/1993 | Tsutsumi et al. |
| 5,366,820 A | 11/1994 | Tsutsumi et al. |
| 5,427,870 A | 6/1995 | Joshi et al. |
| 5,932,365 A | 8/1999 | Lin et al. |
| 5,962,155 A | 10/1999 | Kuranaka et al. |
| 5,976,725 A | 11/1999 | Gamo et al. |
| 6,110,611 A | 8/2000 | Stuhler et al. |
| 6,238,814 B1 | 5/2001 | Horiguchi et al. |
| 6,268,077 B1 | 7/2001 | Kelley et al. |
| 6,380,507 B1 | 4/2002 | Childs |
| 6,617,066 B2 | 9/2003 | Sugawara |
| 6,686,079 B2 | 2/2004 | Zhang et al. |
| 7,273,670 B2 | 9/2007 | Hatayama et al. |

*Primary Examiner* — Jane Rhee
(74) *Attorney, Agent, or Firm* — Albrecht Tousi & Farnum PLLC; Ralph P. Albrecht; Cameron H. Tousi

(57) ABSTRACT

A portable electricity generation device comprises a plurality of fuel cells, each fuel cell having an anode end with a catalyst facilitating the separation of hydrogen atoms into electrons and protons, a cathode end facilitating the combination of the electrons and protons into water molecules in the presence of oxygen, and a current bearing portion providing a current path for the electrons to traverse. The electricity generation device also includes a fuel storage container for storing a supply of hydrogen and delivering the supply of hydrogen to an anode end of the plurality of fuel cells so as to initiate a flow of the electrons through the current bearing portion. In addition, the portable electricity generation device includes an air moving device configured to direct atmospheric air toward a cathode end of the plurality of fuel cells, wherein the air moving device is positioned to convectively cool the plurality of fuel cells as it supplies atmospheric air to the cathode end.

20 Claims, 15 Drawing Sheets

FORCED AIR FUEL CELL POWER SYSTEM

BRIEF DESCRIPTION OF THE INVENTION

This invention relates generally to power systems. More specifically, this invention relates to hydrogen fuel cell power systems with forced air supplies.

BACKGROUND OF THE INVENTION

Small portable electrical and electronic devices have typically used batteries for power. However, conventional batteries have limited energy storage capacity. Thus, applications like professional video cameras, laptop computers, and cell phones often require longer runtimes than batteries can provide.

These conventional batteries can be replaced by a fuel cell integrated with a fuel storage container that stores hydrogen, hydrogen rich gas, or a substance from which hydrogen can be extracted on demand. Such a fuel cell includes an anode end for splitting hydrogen atoms into electrons and protons, a current bearing portion providing a pathway for the electrons, a medium such as a proton exchange membrane providing a pathway for the protons, and a cathode end for rejoining the electrons and protons into water molecules in the presence of oxygen. Such a fuel cell can thus generate electricity over a longer time period than conventional batteries can, provided that the hydrogen in the storage container is periodically refreshed.

It is therefore desirable to develop a hydrogen fuel cell electricity generation device capable of supplying electricity for a longer period of time than conventional batteries.

As conventional batteries can be designed to power small, portable devices, it is also desirable to develop a hydrogen fuel cell electricity generation device that is sufficiently small and lightweight to be of use in portable electrical and electronic devices.

SUMMARY OF THE INVENTION

A portable electricity generation device comprises a plurality of fuel cells, each fuel cell having an anode end with a catalyst facilitating the separation of hydrogen atoms into electrons and protons, a cathode end facilitating the combination of the electrons and protons into water molecules in the presence of oxygen, and a current bearing portion providing a current path for the electrons to traverse. The electricity generation device also includes a fuel storage container for storing a supply of hydrogen and delivering the supply of hydrogen to an anode end of the plurality of fuel cells so as to initiate a flow of the electrons through the current bearing portion. In addition, the portable electricity generation device includes an air moving device configured to direct atmospheric air toward a cathode end of the plurality of fuel cells, wherein the air moving device is positioned to convectively cool the plurality of fuel cells as it supplies atmospheric air to the cathode end.

DETAILED DESCRIPTION OF THE INVENTION

Figure 1:
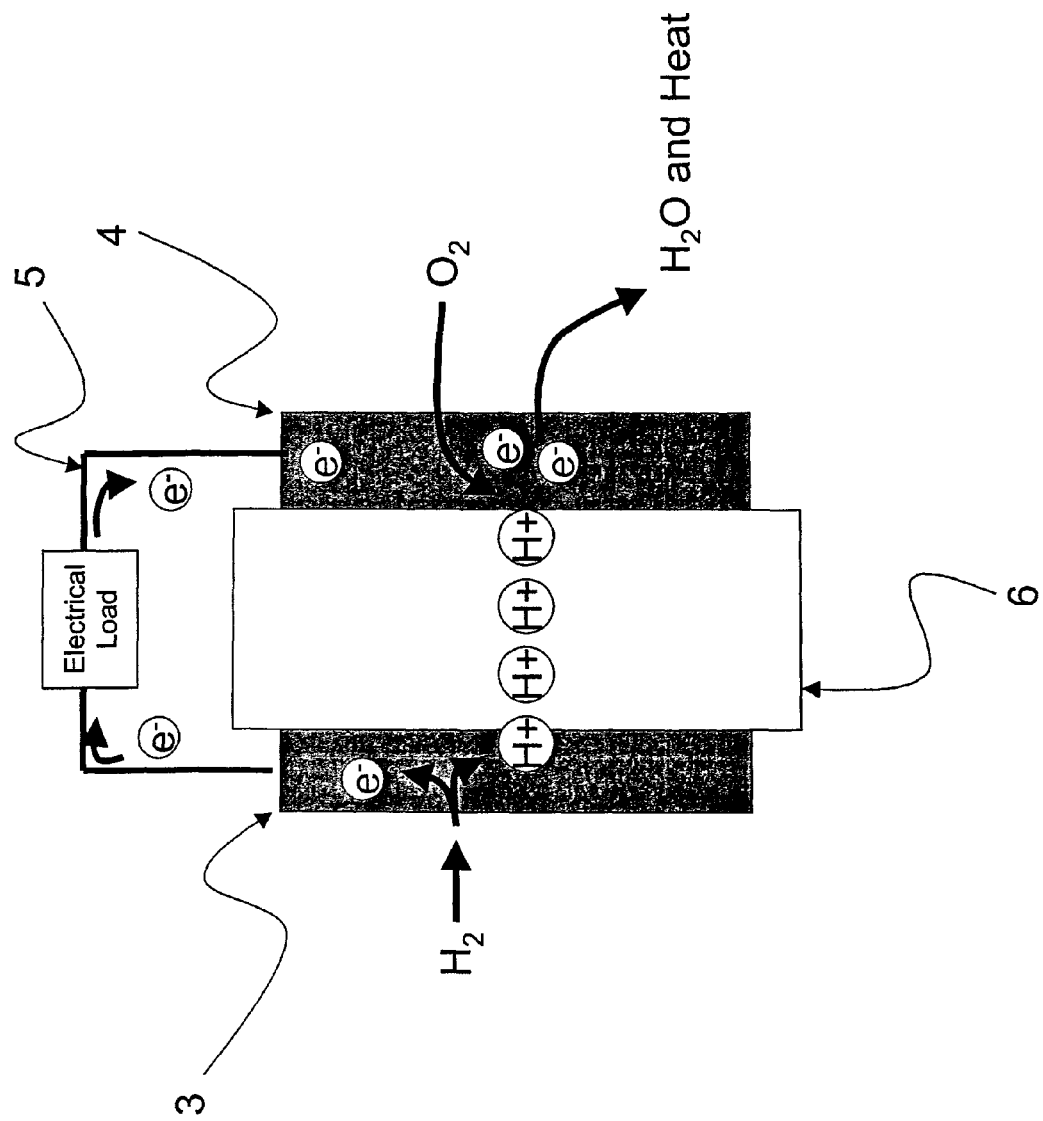
FIG. 1 illustrates the operation of a prior art hydrogen fuel cell.

FIG. 1 illustrates the operation of a conventional polymer electrolyte membrane (PEM) hydrogen fuel cell as utilized in aspects of the present invention. A fuel cell (2) includes an anode end (3) and a cathode end (4), which are connected by a current bearing portion (5) and a PEM (6). The fuel cell (2) carries out an electrochemical reaction that converts hydrogen fuel into electricity and water in the presence of atmospheric oxygen. Specifically, the anode end (3) exposes a catalyst, such as platinum, that encourages the ionization of molecular hydrogen ($H_2$). In operation, $H_2$ that contacts the platinum of anode end (3) is ionized into electrons and protons. The electrons are carried by the conductive current bearing portion (5) to form an electric current which travels to the cathode end (4), and which can be used in applications such as the powering of electronic devices. The porous PEM 6 provides a medium by which The protons travel to the cathode end (4), where they are combined in the presence of molecular oxygen ($O_2$) to form water molecules ($H_2O$).

A portable electricity generation device (50) that is used to store energy and replace secondary batteries consists of a fuel storage container (13) for storing a supply of hydrogen fuel, a fuel delivery apparatus (14) that connects the fuel storage container (13) to a stack or plurality of fuel cells (11) that each have an anode end (3) and a cathode end (4), an oxidant source such as atmospheric air, and an air moving device (12) such as a fan. In operation, the fuel cell power system (50) converts molecular hydrogen $H_2$ to $H_2O$ in the presence of oxygen from the atmosphere according to the above described process, generating an electric current in the process.

Figure 2:
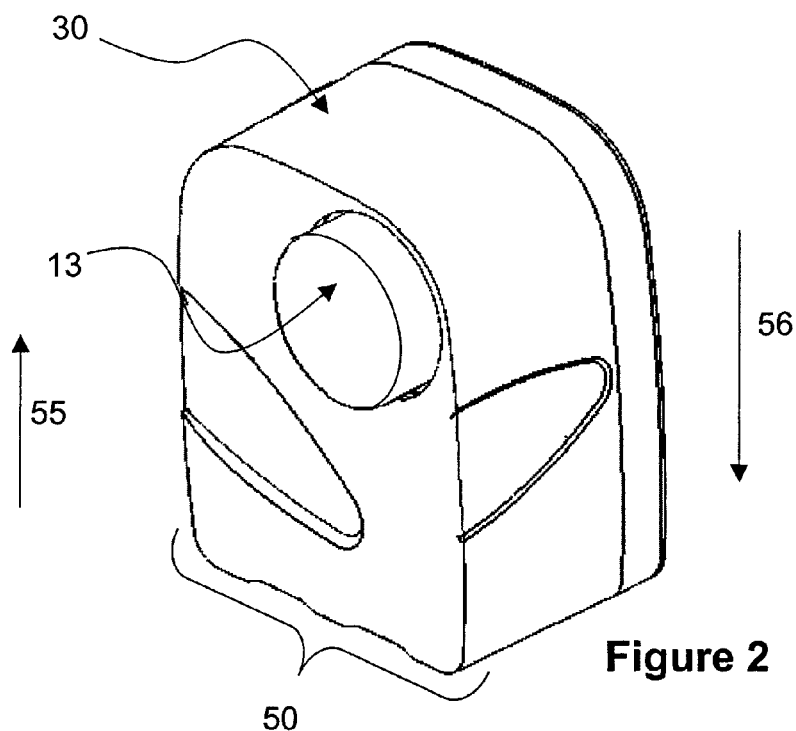
FIG. 2 illustrates a portable electricity generation device constructed in accordance with an embodiment of the invention.
Figure 3:
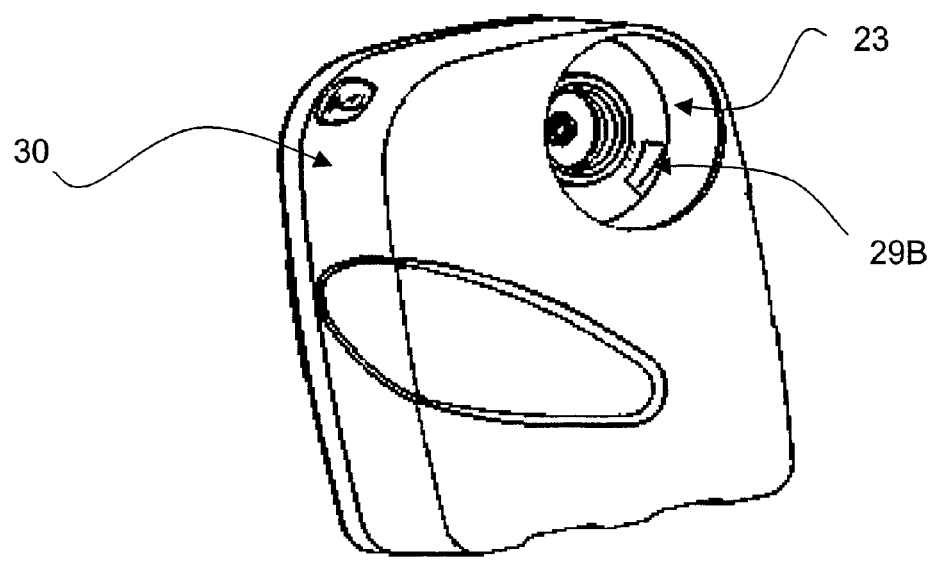
FIG. 3 illustrates a portable electricity generation device constructed in accordance with an embodiment of the invention.
Figure 4:
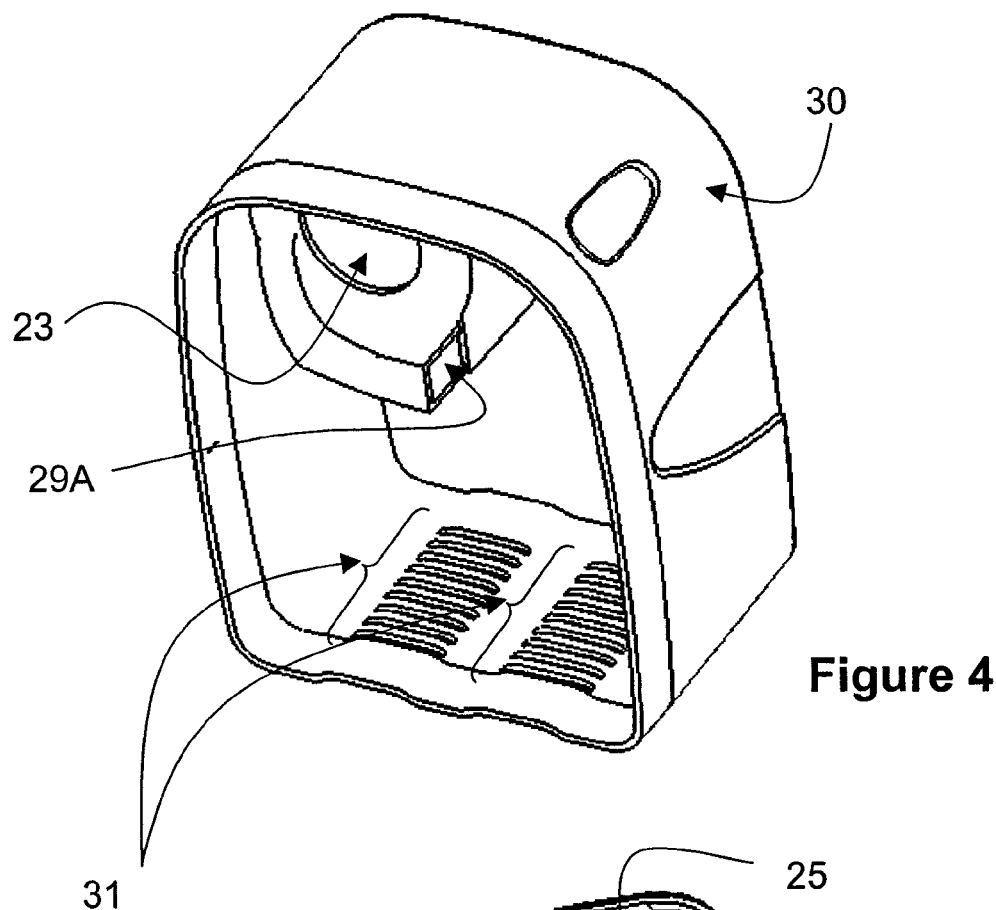
FIG. 4 illustrates a cover of a portable electricity generation device, constructed in accordance with an embodiment of the invention.

In one embodiment the fuel cell power system (50) includes a stack of fuel cells (11) that is supplied with hydrogen from a fuel storage container (13), also referred to as a fuel tank, fuel canister, fuel cartridge or fuel storage system, and the entire assembly is enclosed by a cover (30), see FIG. 2. The upward facing arrow (55) points towards the top of the system in its preferred orientation and the downwards facing arrow (56) points towards the bottom of the system in its preferred orientation. The cover (30) allows for the attachment and detachment of the fuel storage container (13) without having to remove the cover (30). A longitudinal cavity (23) in the cover creates a path to insert the fuel storage cartridge (13) and connect it to its connection interface within the power system (50), see FIG. 3. The cover (30) has openings (31) at the bottom to allow air to enter the system (50), see FIG. 4.

Figure 5:
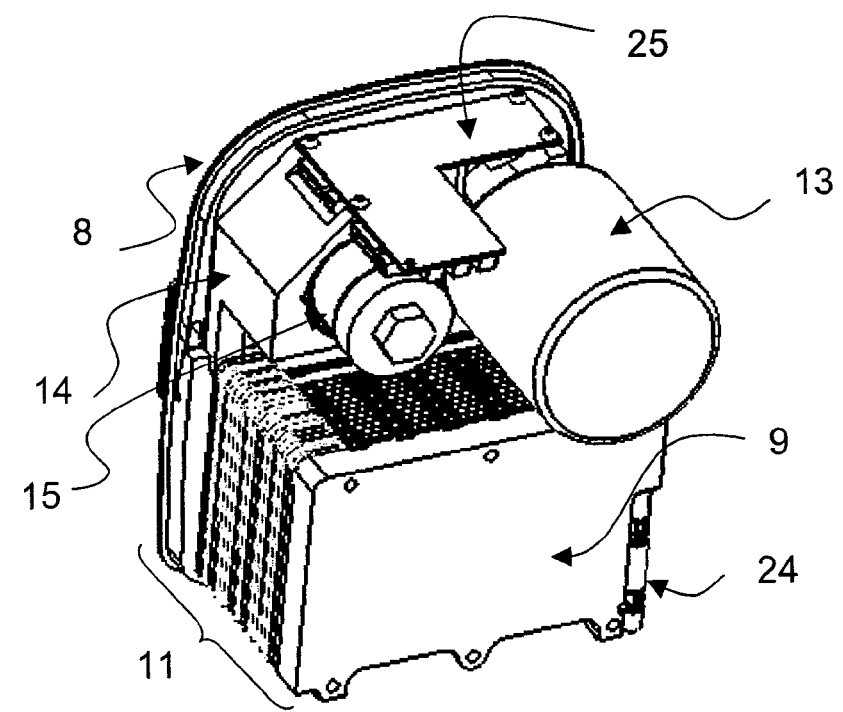
FIG. 5 illustrates a portable electricity generation device constructed in accordance with an embodiment of the invention.
Figure 6:
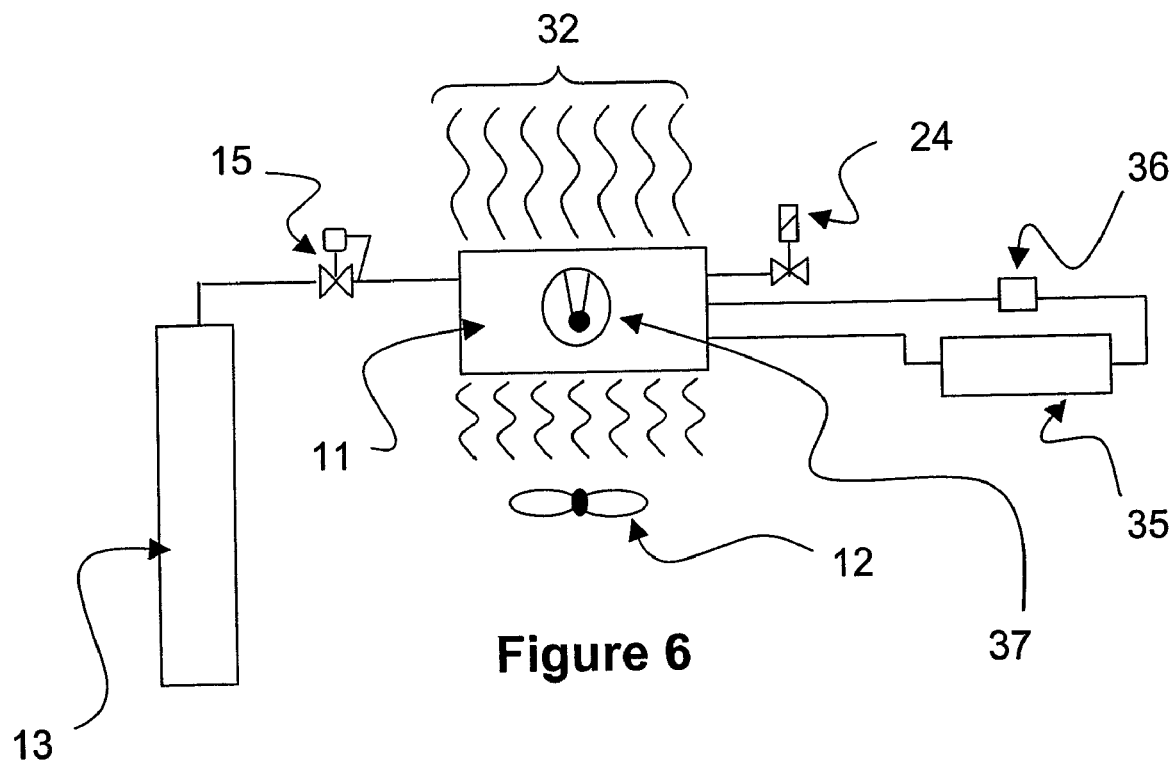
FIG. 6 illustrates the operation of a portable electricity generation device constructed in accordance with an embodiment of the invention.

In this embodiment, the fuel storage container (13) stores compressed hydrogen as the fuel for the fuel cells (11). A pressure regulator (15) is used to reduce the pressure of hydrogen in the fuel storage container (13) to a level acceptable to the stack of fuel cells (11). A purge valve (24) is connected to the outlet of the stack of fuel cells (11) by conventional methods. The purge valve (24) can be a standard normally closed solenoid valve, see FIG. 5. The valve (24) is activated when it receives the appropriate signal from a control circuit (25). In this embodiment, air is used as the source of oxidant. Ambient or atmospheric air surrounding the system (50), driven by a conventional air moving device (12) (not shown in this figure), is the preferred oxidant supplied to the stack of fuel cells (11), see FIG. 6. The flow rate of air supplied to the stack of fuel cells (11) is controlled by a conventional electronic control circuit (25) that can, according to known methods, utilize temperature, pressure, voltage and/or current inputs to control fan or blower speeds. FIG. 6 illustrates a thermocouple (37) and a current shunt (36) that, respectively, monitor the temperature and the load current supplied by the stack of fuel cells (11). The thermocouple (37) is placed to monitor temperatures close to the center of the stack of fuel cells (11). The current shunt (36) is placed in line with the output of the system. As above, the oxygen contained in the air supplied is used to complete the fuel cell reaction that results in the production of electrical energy, heat energy and water.

The reaction of the fuel cell is dependent on the operating temperature of the stack of fuel cells (11), the availability and purity of hydrogen supplied by the fuel storage container (13), and the availability and pressure of the oxidant supplied to it by the air moving device (12). Further, as it is known in the art to use a proton exchange membrane fuel cell, the humidity of gases within the stack of fuel cells (11) can be a major factor influencing the performance of the system.

Figure 7:
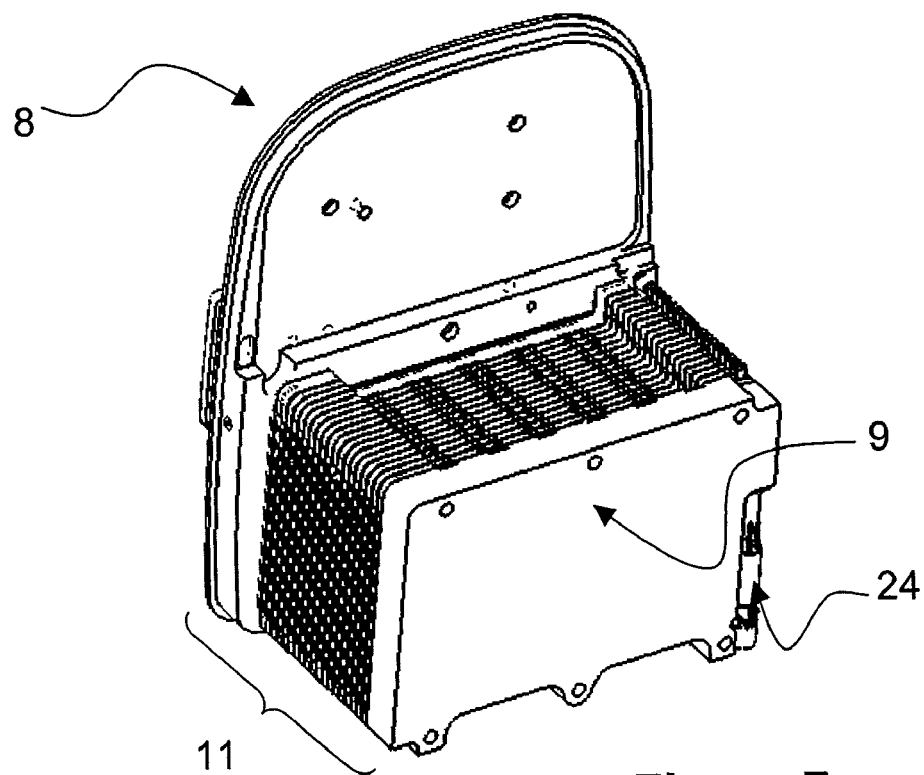
FIG. 7 illustrates fuel cells from a portable electricity generation device constructed in accordance with an embodiment of the invention.

The stack of fuel cells (11) is created from individual fuel cells sandwiched between a front plate (8) and a back plate (9), see FIG. 7. Oxygen for the stack of fuel cells (11) is supplied from the ambient atmosphere. The stack of fuel cells (11) is configured with individual fuel cells placed proximate to each other in a manner that creates space between the cells. The cathode end (4) of each individual cell assembly is thus capable of being placed in significant contact with atmospheric oxygen. Hydrogen for the fuel cells is supplied to each cell assembly via plates with channels that direct the hydrogen toward the anode end (3) of the fuel cell system. The top and bottom of the stack of fuel cells (11) in the preferred orientation of the power system (50) are open to the ambient atmosphere in a way that air can easily pass through the stack of fuel cells (11). The electrical output from the stack of fuel cells (11) is collected from the current bearing portions (5) of each fuel cell (11).

In one embodiment the stack of fuel cells (11) is capable of utilizing the oxygen in the surrounding ambient atmosphere. When supplied with hydrogen fuel from the fuel cartridge (13), the stack of fuel cells (11) is capable of completing the abovementioned electrochemical reaction to supply electrical energy by just breathing the air within the stack of fuel cells (11).

In such a system the heat produced by the fuel cell reaction cannot be effectively removed, resulting in the temperature of the stack of fuel cells (11) rising to a point of failure. In order to prevent such a failure the stack of fuel cells (11) must be operated at a point where the heat from the reaction is rejected via natural convection, thus reducing the power capability of the system.

Figure 8:
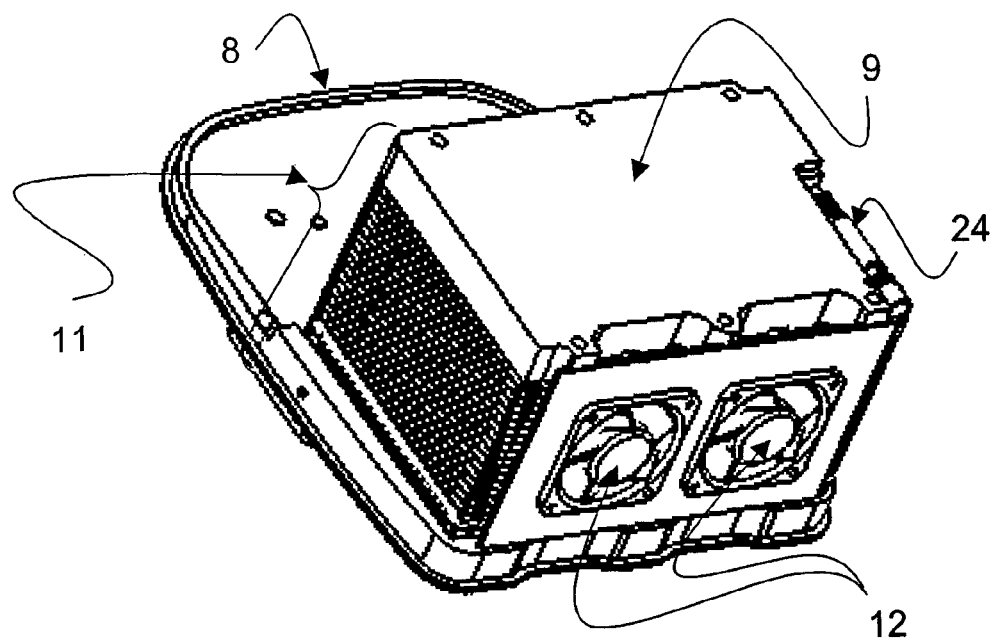
FIG. 8 illustrates fuel cells from a portable electricity generation device constructed in accordance with an embodiment of the invention.

The stack of fuel cells can therefore be supplied with air using an air moving device (12) such as a fan or low pressure blower. While typical fuel cell systems are known to require air pumps, compressors or high pressure blowers to supply the required air to the stack of fuel cells (11), the current embodiment allows the use of a low pressure air moving device (12) like a fan or low pressure blower. Usage of the fan or low pressure blower has a number of advantages such as:

Very low acoustic signature
Low power consumption
Ease of control
Very low air speeds In the present embodiment the air moving device (12) is positioned such that air is blown into the stack of fuel cells (11), see FIG. 8. Two fans can be used, as shown; however, the same effect may be obtained with a single fan. The stream of atmospheric air provides oxygen needed for the electrochemical reaction. The remainder of the air flows through the system. When the temperature of the stack of fuel cells (11) is higher than that of the air supplied by the air moving device (12) the fuel cell loses heat from the fuel cell reaction to the air stream.

Figure 9:
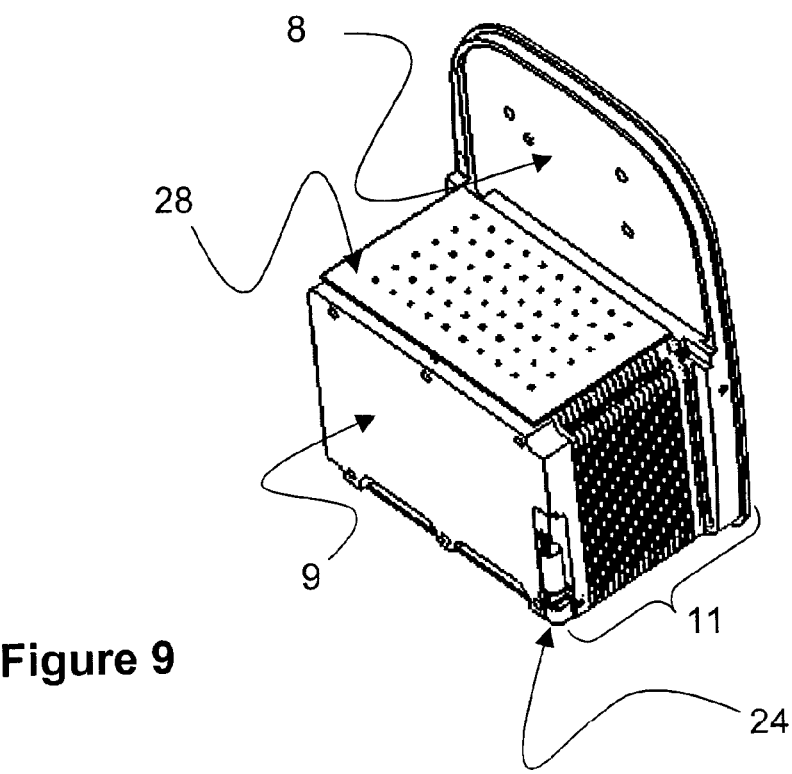
FIG. 9 illustrates a seal plate from a portable electricity generation device constructed in accordance with an embodiment of the invention.

The top of the stack of fuel cells (11) can also have an attached seal plate (28) with openings for air to exhaust from the stack of fuel cells (11). By varying the area of the openings in the seal plate (28) the flow rate and the pressure of air in the stack of fuel cells (11) can be changed, see FIG. 9.

Figure 10:
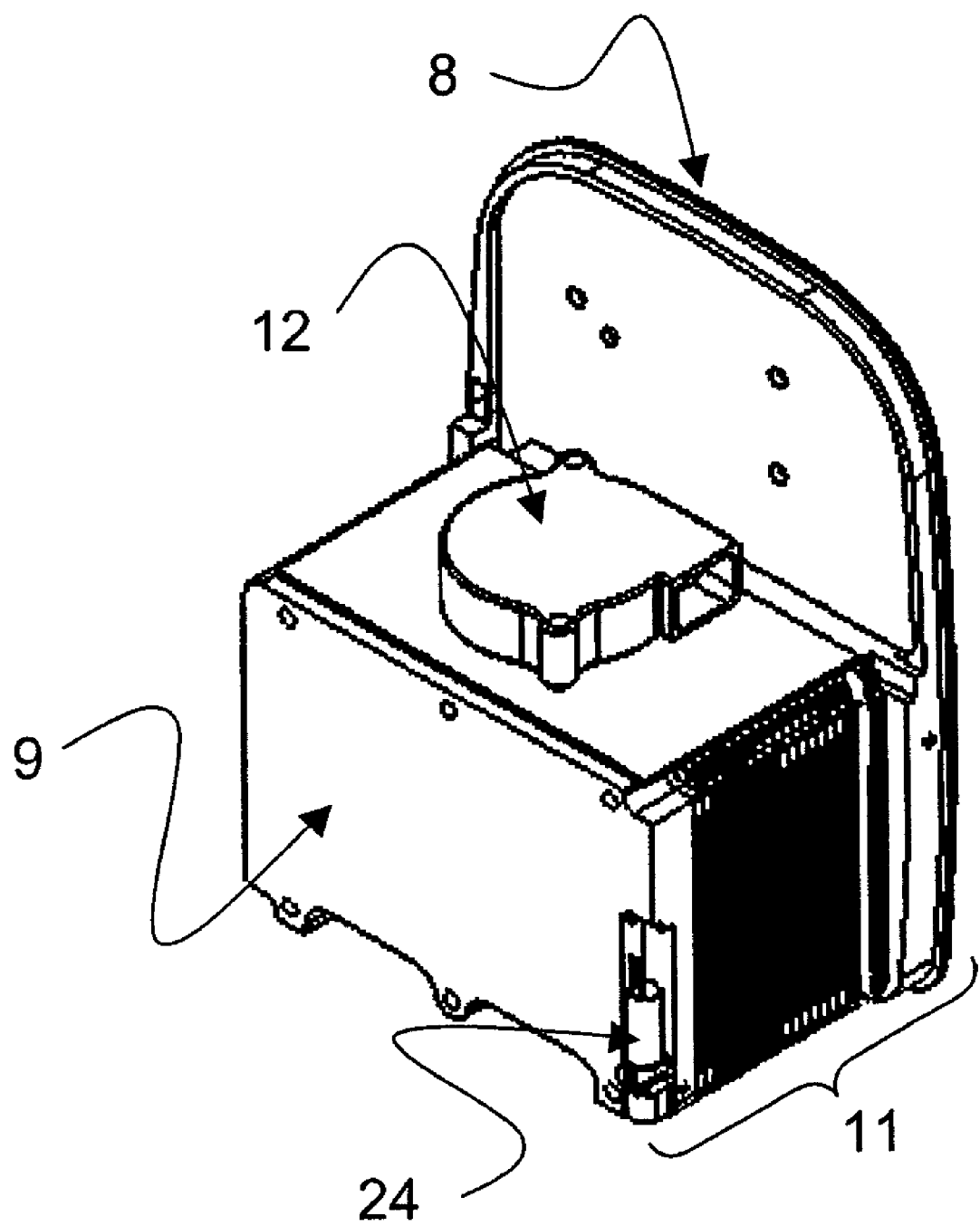
FIG. 10 illustrates an air moving device from a portable electricity generation device constructed in accordance with an embodiment of the invention.

The air moving device can also be positioned such that the stack of fuel cells (11) is on the low pressure side of the air moving device (12), see FIG. 10. In such a situation the air moving device (12) draws air through the stack of fuel cells (11) and expends it away from the stack of fuel cells (11). After oxygen in the air is consumed by the stack of fuel cells (11) the remainder of the air is used to conduct away the heat of the fuel cell reaction.

Figure 11:
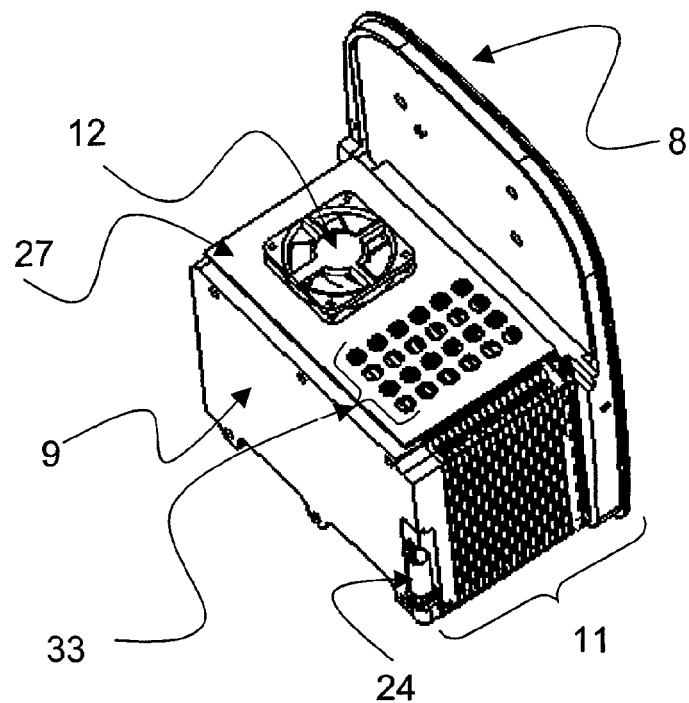
FIG. 11 illustrates an air moving device from a portable electricity generation device constructed in accordance with an embodiment of the invention.
Figure 12:
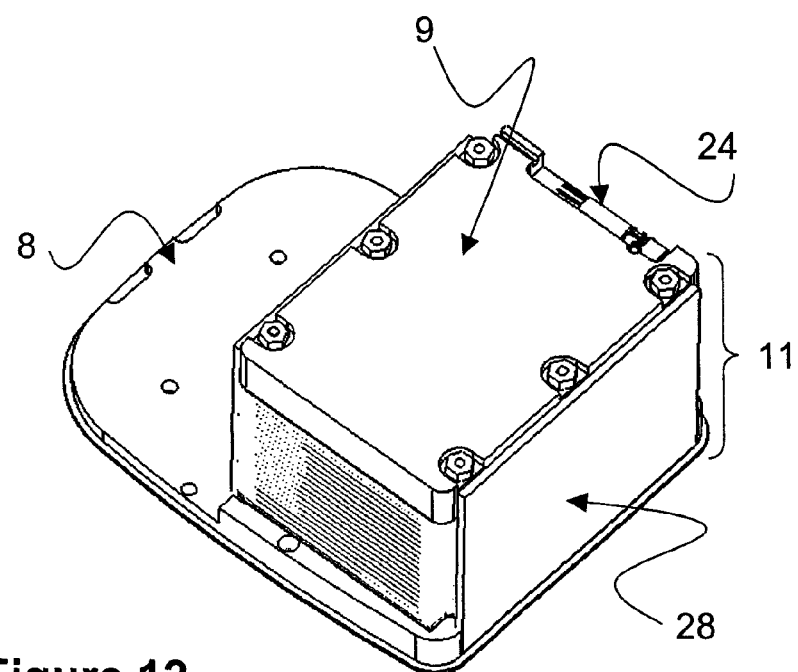
FIG. 12 illustrates a seal plate from a portable electricity generation device constructed in accordance with an embodiment of the invention.

Similarly, the air moving device (12) can also be positioned on top of the stack of fuel cells (11) by the fan or low pressure blower mounting plate (27), see FIG. 11. The fan or low pressure blower mounting plate (27) is of area that is equal to the area of the top of the stack of fuel cells (11). The fan or low pressure blower mounting plate (27) is attached to the stack of fuel cells (11) using techniques known to one of skill in the art. The air moving device (12) is positioned such that it blows air through a cross sectional area of the fuel cell stack (11) that is significantly smaller than the cross sectional area available at the top of the stack of fuel cells (11). The bottom of the fuel cell stack is sealed off using a seal plate (28), see FIG. 12.

When the air moving device (12) supplies air to the fuel cell stack, the air flows through the stack of fuel cells. It then strikes the seal plate, changes direction, and returns to the top of the stack of fuel cells (11), eventually escaping out through the openings (33) in the air mount plate (27). This change of direction results in improved heat transfer characteristics for the fuel cell stack (11). In addition, the opposing streams of incoming and outgoing air from the fuel cell stack (11) result in the hot outgoing air stream transferring some of the heat and water collected from the fuel cell reaction back to the incoming air stream, thus helping to retain a moist environment resulting in consistent performance of the stack of fuel cells (11). In addition, by controlling the openings (33) of the exhaust in the air mount plate (27), the degree of backpressure in the stack of fuel cells (11) can be more precisely controlled.

The seal plate (28) can be advantageously made of a material that is a good conductor of heat and can be used to perform the function of an intermediate heat exchanger. While a flat or planar seal plate is discussed here, one of skill in the art will realize that non-planar surfaces like those seen in commercial heat sinks (that increase the surface area available for heat transfer) can also be used, allowing for improved heat transfer from the seal plate. For further improved heat transfer, a conventional fluid heat transfer methods may be employed to better control the temperature of the seal plate (28) and thus improve the efficiency of heat transfer between the air in the stack of fuel cells (11) and the seal plate (28).

A porous sponge like material that is a good conductor of heat can also be applied to the surface of the seal plate (28). The porosity of this sponge like material provides a large surface area for the air in the fuel cell system (50) to better transfer heat away from the fuel cells (11).

Figure 13:
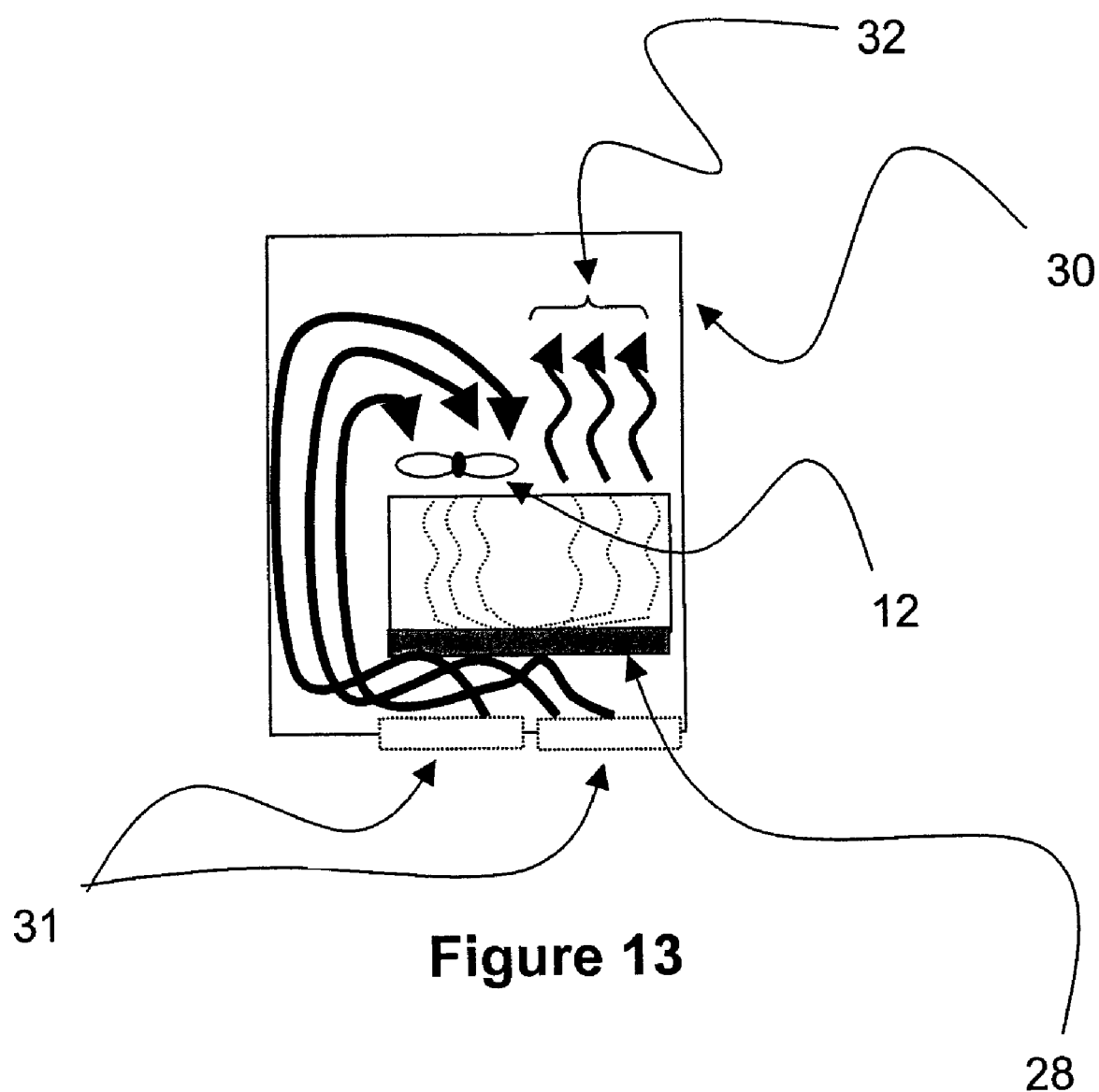
FIG. 13 illustrates a preheater for a portable electricity generation device constructed in accordance with an embodiment of the invention.

As illustrated in FIG. 13, the seal plate (28) can act as a preheater for air entering the stack of fuel cells (11). The inlet ports (31) of the cover (30) are configured with respect to the seal plate (28) such that air travels through the power system and passes near the seal plate (28), thus being heated by waste heat from the fuel cells (11). The air then generally traverses the path denoted by the arrows, and is fed to the stack of fuel cells (11). The ability to preheat the air entering the stack of fuel cells (11) is important in maintaining uniform operating conditions for the stack of fuel cells (11) in the face of changing conditions, for example when the ambient temperature drops significantly.

Figure 14:
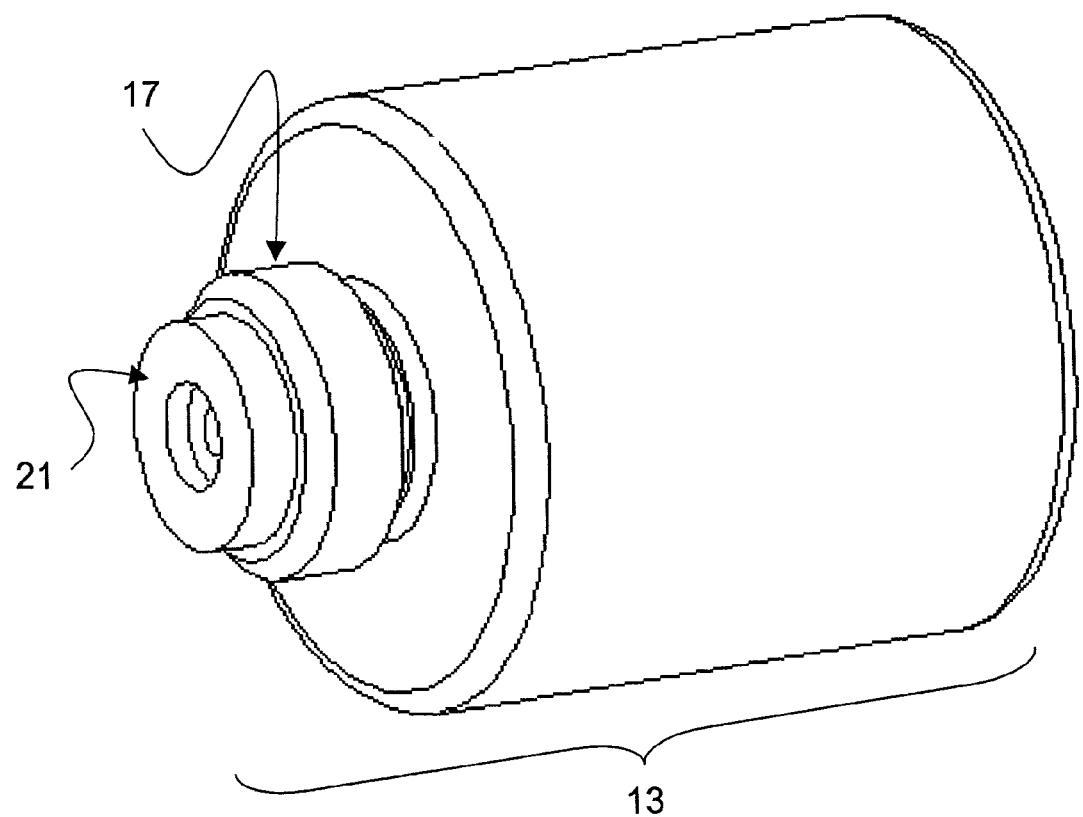
FIG. 14 illustrates a hydrogen storage container for a portable electricity generation device constructed in accordance with an embodiment of the invention.

The fuel storage container (13) can be configured as a removable and replaceable cartridge. Hydrogen required by the stack of fuel cells (11) is then stored in this cartridge (13), see FIG. 14. In such a case, the fuel storage cartridge (13) can be a metal or composite container filled with a metal that can store hydrogen as a metal hydride. Some of the well known metal hydrides are those made from palladium, lanthanum and nickel alloys, and alloys of iron and titanium. Alternatively, the fuel storage cartridge (13) can contain a chemical compound such as sodium hydride or sodium boro-hydride, along with water. Such hydrides liberate hydrogen through an exothermic reaction upon reaction with water. Hydrogen could also be stored within conventional carbon-graphite nano-fibers, known to provide very high storage capabilities. As is known to those of skill in the art, hydrogen can be stored in any one of numerous forms, including those described above, within the cartridge (13).

Typically, such hydrogen storage methods allow for liberation of this hydrogen under pressure. Hence, a pressure regulator (15) is used to manage the pressure to a level acceptable to the stack of fuel cells (11).

In order for the fuel cell power system to operate over a long period of time, the system should allow for the replacement of the spent fuel storage cartridge (15) with a new filled fuel storage cartridge. The fuel storage cartridge (13) can thus consist of a self sealing connector (21) and a mechanism to mate the cartridge (13) to the remainder of the fuel cell system. An interface such as a coarse screw thread (17) mates the cartridge (13) with the corresponding threads (18) located in the fuel cell system. The connector results in the opening of the self sealing connector (21) and supply of hydrogen to the fuel cell system. The interface that uses the coarse screw threads (17, 18) creates a leak tight joint between the cartridge (13) and the rest of the fuel cell system. A twist connector, bayonet mount or any other mate known to one familiar in the mechanical arts may also be used to accomplish the same goal.

When hydrogen supplies are removed from conventional fuel cells pending replacement, no hydrogen is available to the fuel cells, and as a result they typically cease to produce power. There is, however, a need in a number of applications for continuous and uninterrupted operation over a long duration of time. An embodiment of the present invention thus utilizes a tank that acts as a reservoir (16), see FIGS. 15, 16. During normal operation with a hydrogen storage cartridge (13) connected the reservoir (16) is filled with hydrogen from the storage cartridge (13). In addition, the cartridge (13) also supplies hydrogen required for the stack of fuel cells (11) to operate. When the cartridge (13) is removed the stack of fuel cells continues operation discharging the hydrogen stored in the reservoir (16) until no hydrogen remains. The reservoir (16) provides the time required to replace the spent cartridge (13) with a new filled cartridge (13).

Figure 15:
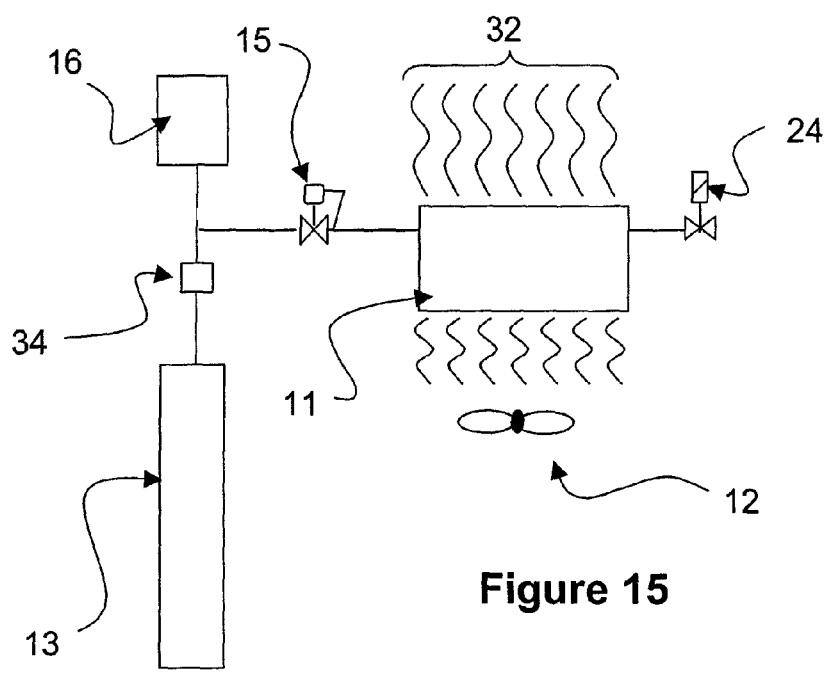
FIG. 15 illustrates the operation of a portable electricity generation device constructed in accordance with an embodiment of the invention.
Figure 16:
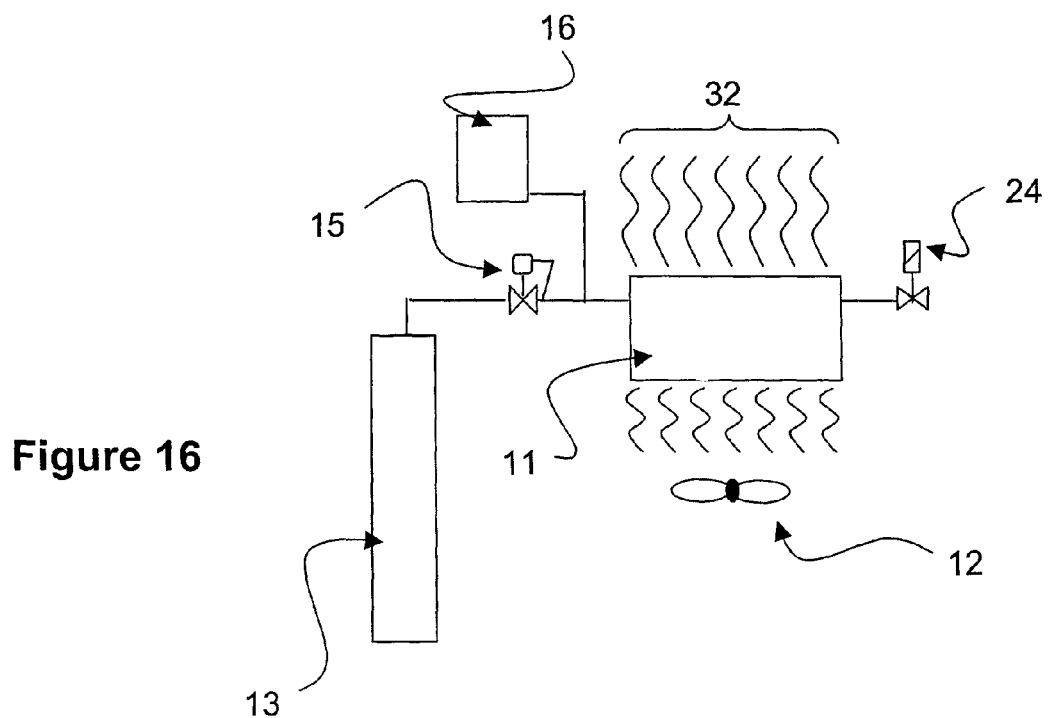
FIG. 16 illustrates the operation of a portable electricity generation device constructed in accordance with an embodiment of the invention.

The reservoir (16) can be connected between the cartridge (13) and the pressure regulator (15) on the high pressure side of the system, see FIG. 15. In this configuration, a check valve (34) is used to ensure that hydrogen stored in the reservoir does not flow back to the storage cartridge (13). In another configuration, the reservoir (16) is connected between the cartridge (13) and the stack of fuel cells (11) on the low pressure side of the system, see FIG. 16.

Figure 17:
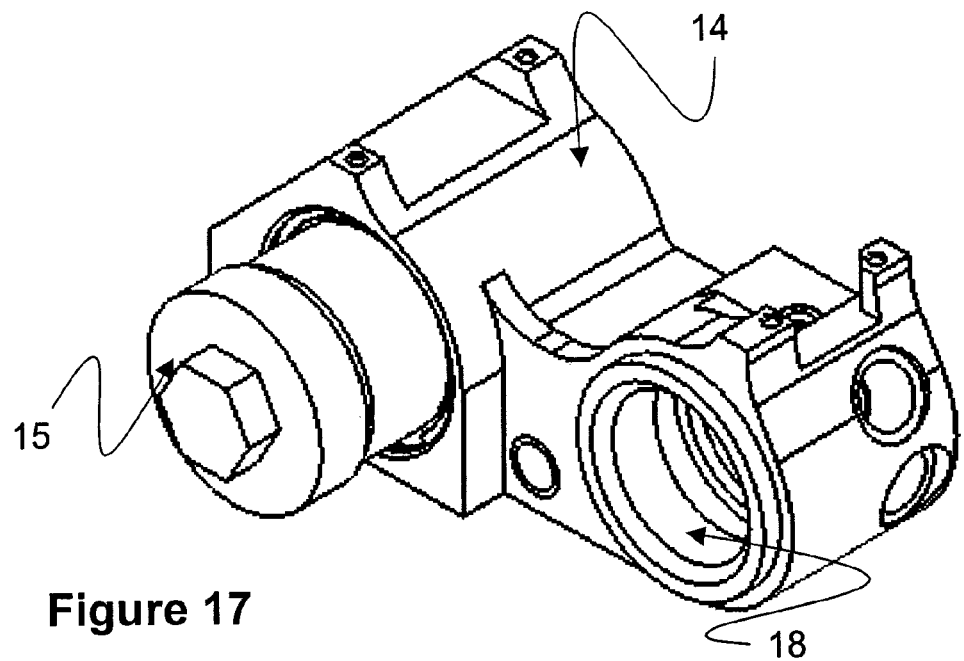
FIG. 17 illustrates a controller for a portable electricity generation device constructed in accordance with an embodiment of the invention.
Figure 18:
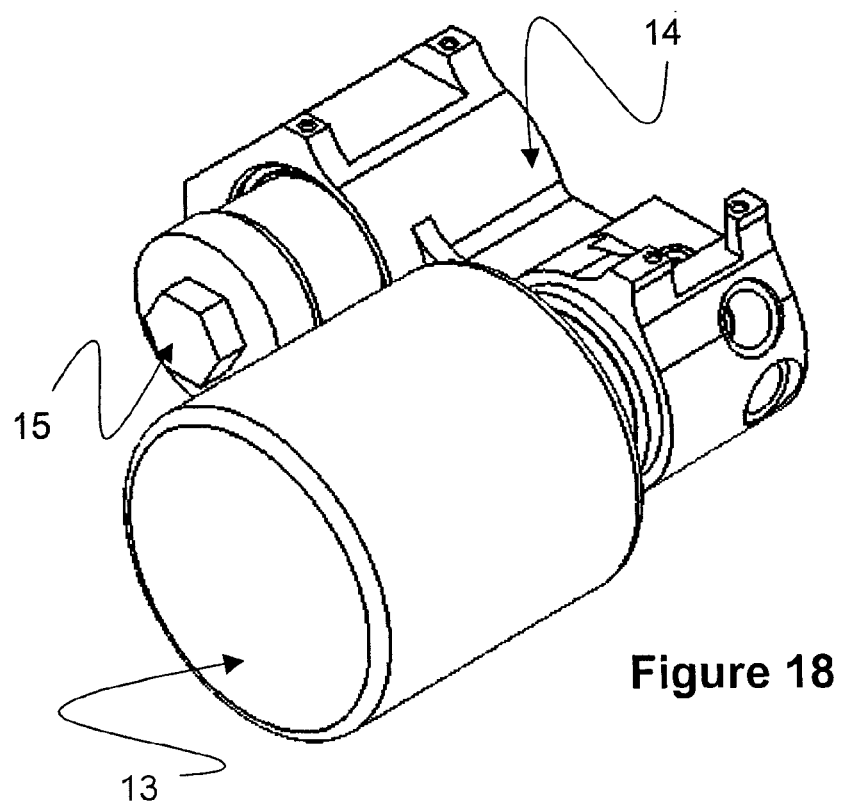
FIG. 18 illustrates a controller for a portable electricity generation device constructed in accordance with an embodiment of the invention.

The above mentioned reservoir (16), pressure regulator (15), interface connection (18) to the storage cartridge (13), and fuel delivery to the stack of fuel cells can all be incorporated in a single component, a control block (14), see FIGS. 17, 18.

Figure 19:
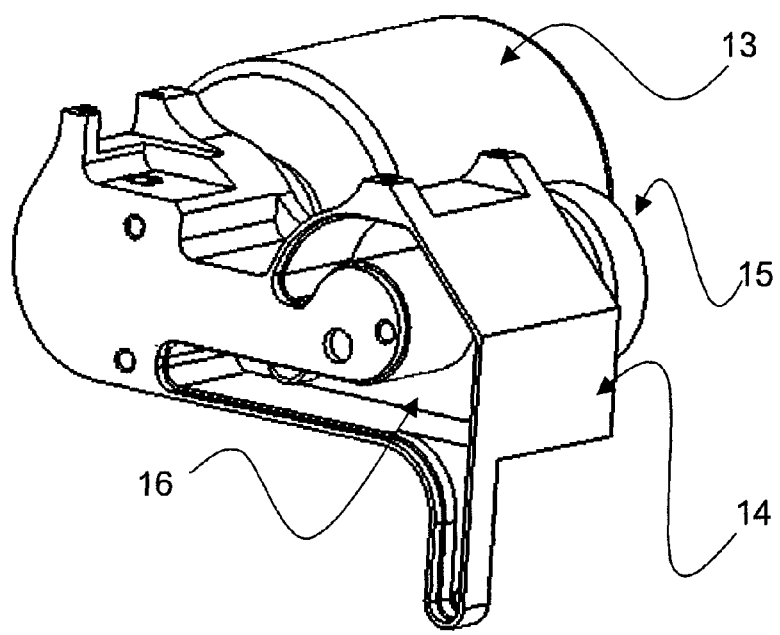
FIG. 19 illustrates a controller for a portable electricity generation device constructed in accordance with an embodiment of the invention.

In such a control block (14), the reservoir (16) can be a cavity built into the control block (14), see FIG. 19, which when mated with the front plate (8) of the stack of fuel cells (11) creates the required reservoir (16). The seal between the control block (14) and the front plate (8) being sealed to contain hydrogen within the control block (14).

Figure 20:
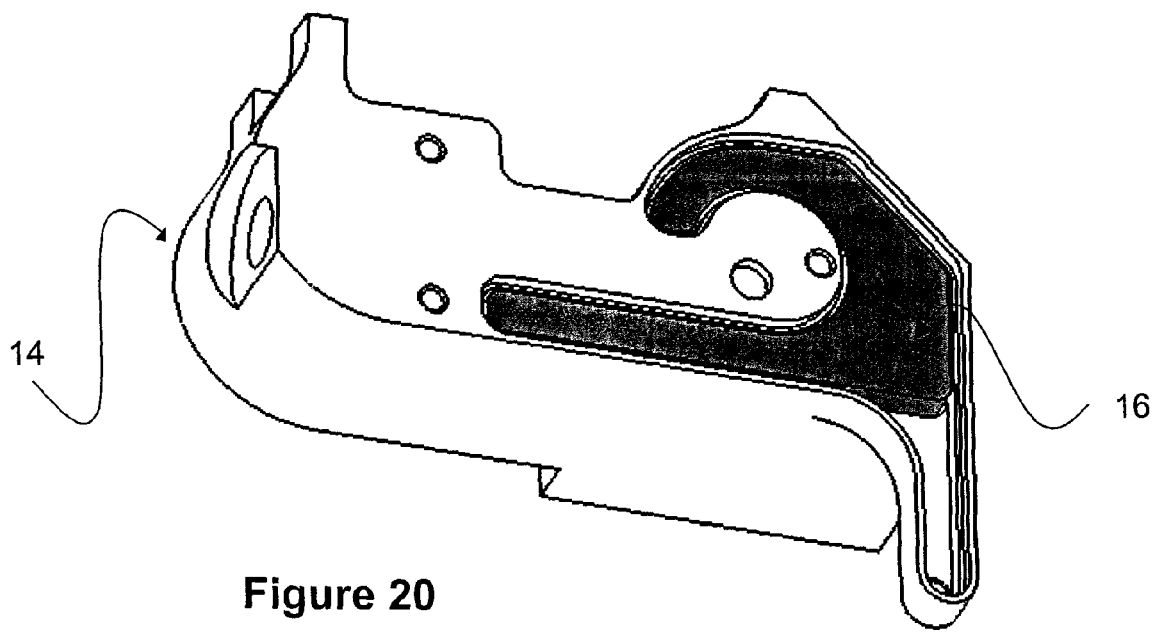
FIG. 20 illustrates a collapsible bladder for a portable electricity generation device constructed in accordance with an embodiment of the invention.

Alternatively, the reservoir (16) can be created by an expandable bladder that expands when filled with hydrogen and collapses as the hydrogen gas is consumed by the stack of fuel cells (11). The bladder (shaded gray), see FIG. 20, can be contained within the cavity (16) in the control block (14), thus limiting its maximum capability to expand. The bladder ensures that the pressure of hydrogen fed to the stack of fuel cells (11) by the reservoir (16) is at a fairly constant pressure.

In addition, the reservoir (16) may be a container that is filled with hydrogen separate from the control block (14). When the reservoir (16) is a separate container, the reservoir (16) can be permanently attached to the control block. In another embodiment the reservoir (16) could be attached and detached from the control block (14) by the system operator. Here, when the cartridge (13) is close to being depleted, the reservoir (16), externally filled with hydrogen, can be connected to the control block (14) to supply the required hydrogen while the cartridge (13) is removed. In this embodiment the reservoir (16) acts like the cartridge (13) in all respects. Those of skill in the art will recognize that a number of methods exist to store hydrogen in the reservoir (16) that have been already discussed in this description, all of which are contemplated in the scope of the invention.

Figure 21:
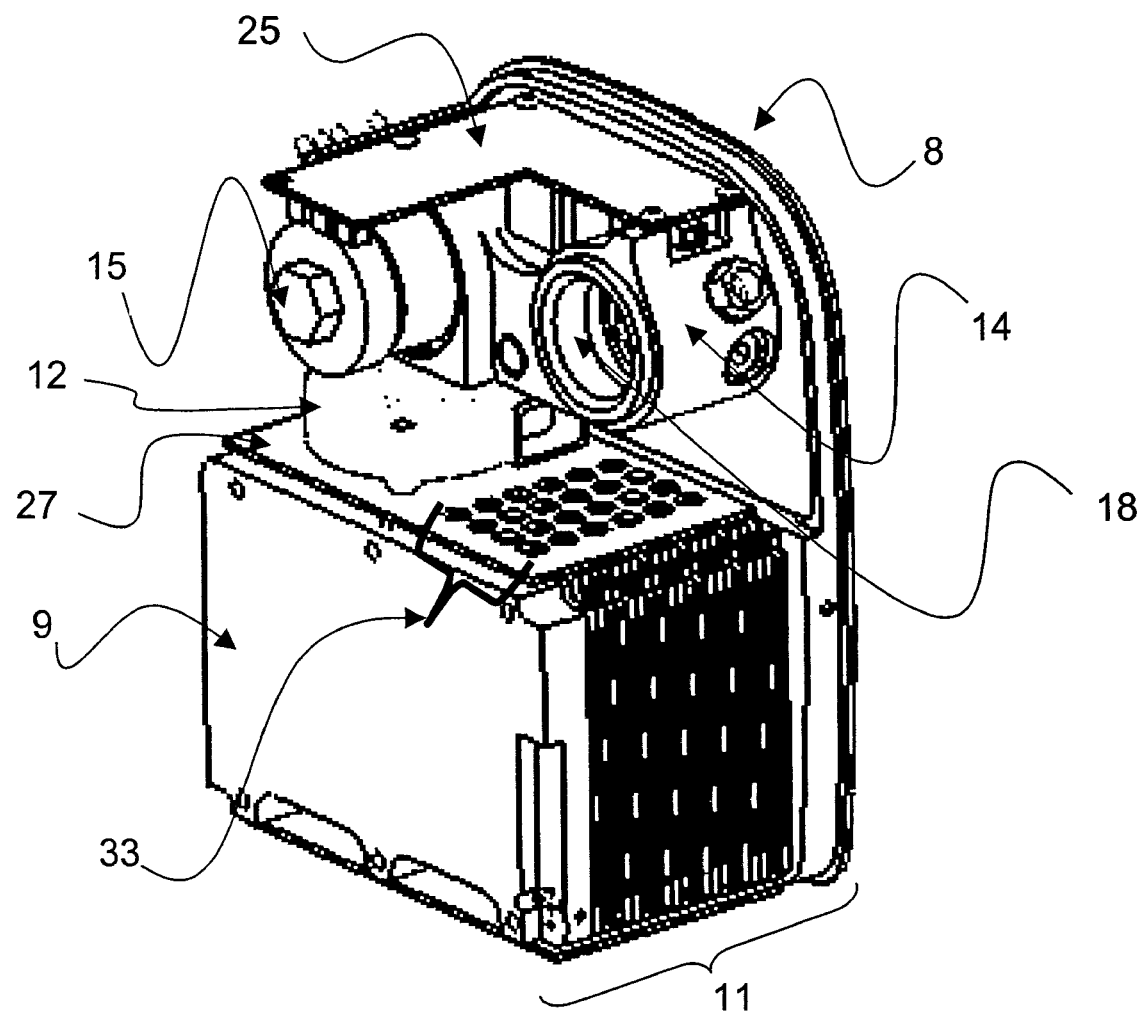
FIG. 21 illustrates a portable electricity generation device constructed in accordance with an embodiment of the invention.

The ability to hot-swap cartridges (13) without interrupting the supply of power is critical to a number of users. For example: in the electronic news gathering industry where recording critical events can be financially rewarding. Losing a shot because the operator is replacing the energy storage device is not acceptable to most if not all the operators.

Where a secondary metal hydride is used to store hydrogen in the cartridge (13), heat energy is required to maintain the evolution of hydrogen at constant pressure. In the absence of heat the hydride drops in temperature, resulting in the drop in pressure and eventually resulting in the cartridge (13) not being able to supply hydrogen to the fuel cells (11). In order to prevent such a situation the invention includes utilization of waste heat created by the inefficiencies in the stack of fuel cells (11) to help maintain the temperature of the hydride energy storage cartridge (13). By placing the storage cartridge (13) directly above the openings (33) in the exhaust air stream (32) from the stack of fuel cells (11), heat energy is supplied to the storage cartridge (13), see FIG. 21. This method, however, may result in a large amount of the hot air avoiding contact with the cartridge (13) and leaving the system.

Figure 22:
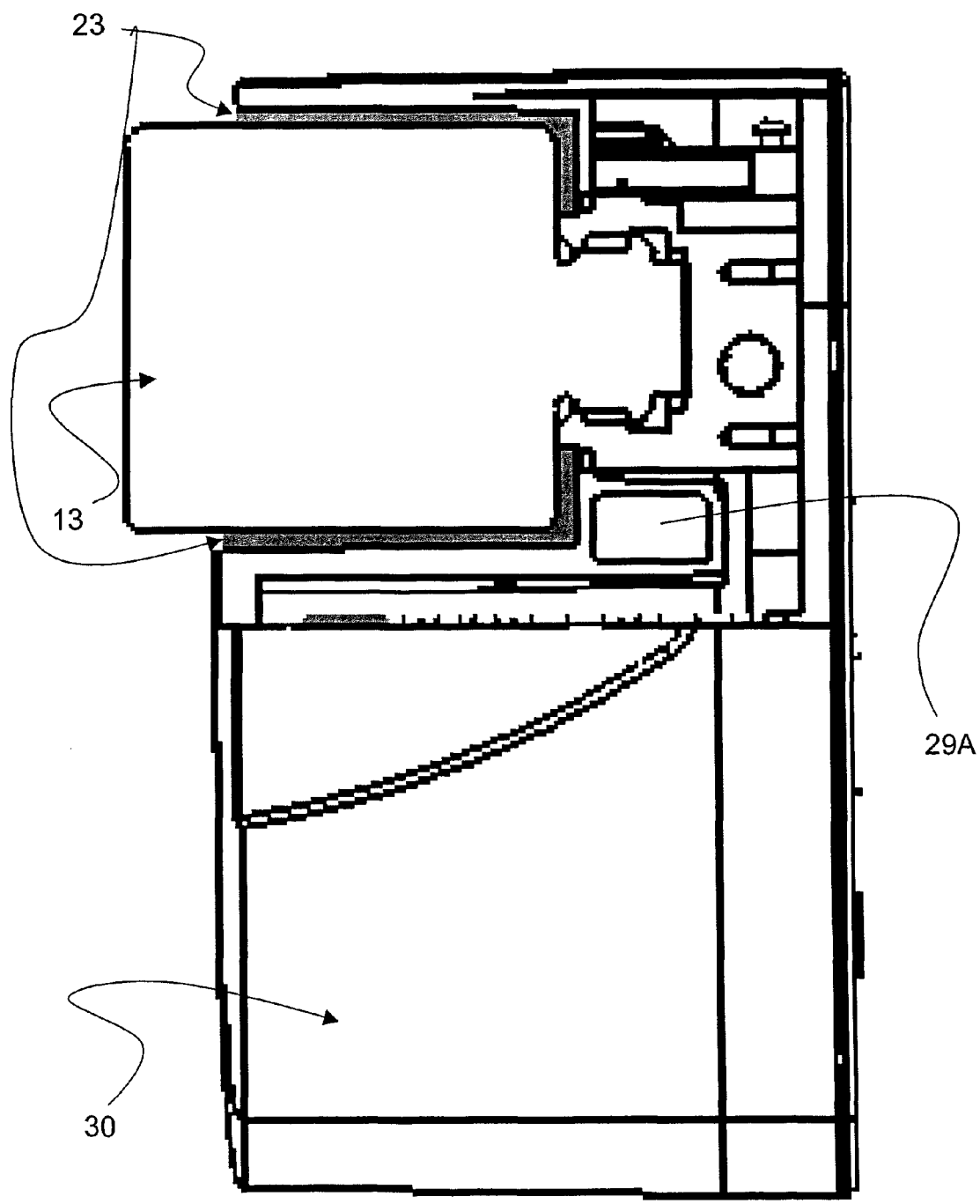
FIG. 22 illustrates a cutaway view of a portable electricity generation device constructed in accordance with an embodiment of the invention.

To alleviate such an inefficiency, the hot air exiting the stack of fuel cells can be routed through features in the cover (30) in a manner where most of the air exhausts out of the system (50) only after coming in contact with the storage cartridge (13). The cover (30) has a longitudinal cavity (23) that is used to accept the storage cartridge (13). The longitudinal cavity (23) is sized such that it creates a small air gap between the storage cartridge (13) and the cover (30), shaded gray; see FIG. 22, along the perimeter of storage cartridge (13).

Figure 23:
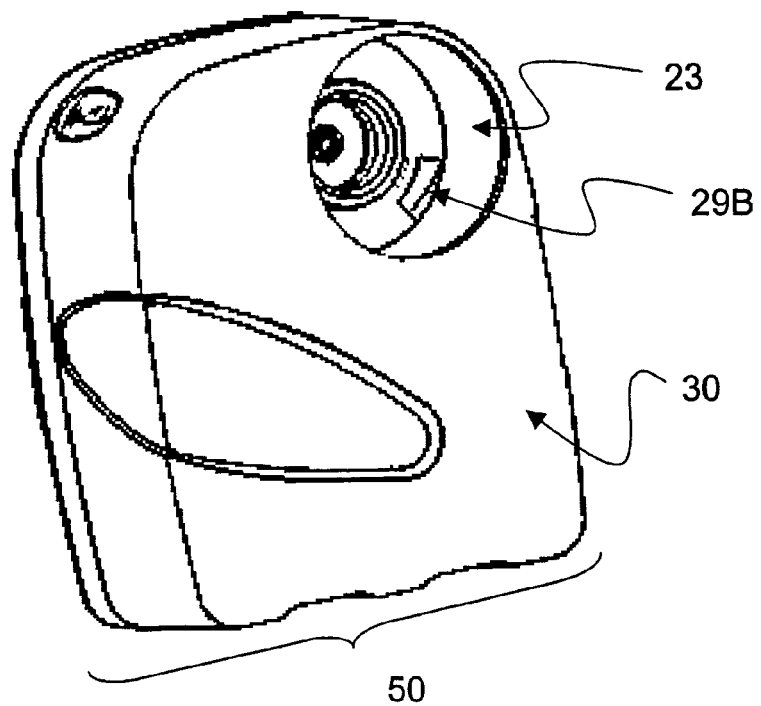
FIG. 23 illustrates a cover for a portable electricity generation device constructed in accordance with an embodiment of the invention.
Figure 24:
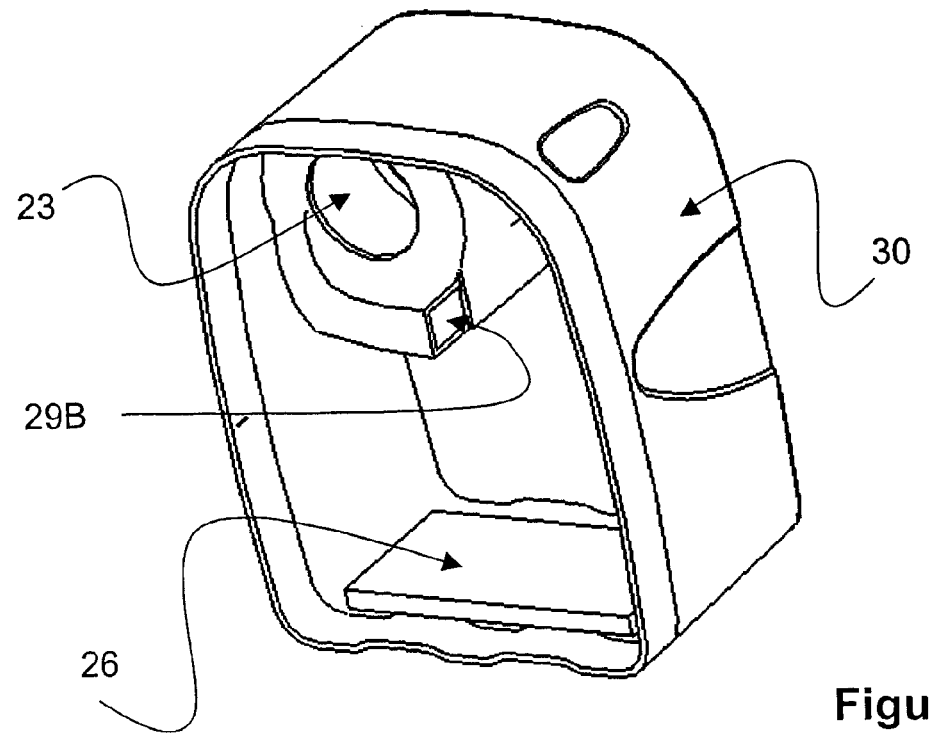
FIG. 24 illustrates a cover for a portable electricity generation device constructed in accordance with an embodiment of the invention.

The cover (30) is designed a duct, such that the exhausting air stream (32) from the stack of fuel cells (11) is routed through inside port (29A) in the cover, through outside port (29B), to the storage cartridge cavity (23), see FIGS. 23, 24. In this embodiment, exhaust air leaving the system (50) must come in contact with the storage cartridge (13). Heat from the air is thus transferred more efficiently to the storage cartridge (13).

The cover (30) can also be designed such that the path from inside port (29A) to outside port (29B) is helical in nature. In such a configuration, the air exiting the system (50) via the cavity (23) will follow a helical path around the storage cartridge (13) increasing the time of contact with the storage cartridge (13) and creating turbulence in the exiting air stream (32), both resulting in improved heat exchange with the storage cartridge (13).

In another configuration, the gap (shaded gray in FIG. 22) created in the cavity (23) between the storage cartridge (13) and the cover (30) can be filled with a porous media, such as a stainless steel sponge, in a manner such that contact is made with the storage cartridge (13) when the cartridge (13) is connected to the system (50). Here, the hot air exhausting the system (50) via the gap (29a) has a relatively large surface area in addition to the surface of the cartridge (13) on which it loses its heat, increasing the efficiency of heat transfer between the exhausting air of the stack of fuel cells (11) and the storage cartridge (13).

The life of the stack of fuel cells (11) is affected by pollutants such as carbon monoxide, chlorine, sulfur dioxide, and particulate dust. The air inlet (31) to the system (50) can thus include a filter (32) which removes pollutants like chlorine, particulate dust and sulfur dioxide from the incoming air stream before it enters the stack of fuel cells (11). Such a filter (32) can be a conventional consumable filter that can be replaced easily by, for instance, removing the cover (30), see FIG. 24.

The operation of the stack of fuel cells (11) is controlled by a conventional control circuit (25) that ensures the safe, reliable and efficient operation of the system (50). The control circuit (25) controls the air supplied to the stack of fuel cells (11) by controlling the air moving device (12) and/or the purge valve (24).

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:
1. A portable fuel cell power device, comprising:
a plurality of fuel cells;
a fuel storage container to store a supply of fuel and provide the fuel to the plurality of fuel cells;
a pressure regulator, disposed between the fuel storage container and the plurality of fuel cells, to reduce the pressure of the fuel provided to the plurality of fuel cells relative to the pressure of the fuel stored in the fuel storage container; and a fuel reservoir, coupled to the plurality of fuel cells and disposed between the pressure regulator and the plurality of fuel cells, to supply fuel to the plurality of fuel cells in the absence of fuel from the fuel storage container, wherein, during operation of the portable fuel cell power device, the fuel reservoir provides continuous and uninterrupted supply of fuel to the plurality of fuel cells in the absence of fuel from the fuel storage container.

2. The portable fuel cell power device of claim 1, further including an air moving device to direct atmospheric air toward the plurality of fuel cells, wherein the air moving device is positioned to convectively cool the plurality of fuel cells during operation.

3. The portable fuel cell power device of claim 2, wherein the air moving device further includes a preheater to heat the atmospheric air prior to directing the atmospheric air toward the plurality of fuel cells.

4. The portable fuel cell power device of claim 2, further including a heating duct to direct the atmospheric air from the plurality of fuel cells.

5. The portable fuel cell power device of claim 2, further including a feedback sensor to analyze the fuel cell, and an electronic control circuit in electrical communication with the air moving device, wherein the electronic control circuit is configured to vary the rate at which the air moving device moves air according to data from the feedback sensor.

6. The portable fuel cell power device of claim 2, further including a seal plate placed proximate to the plurality of fuel cells, wherein the seal plate alters the flow characteristics of the atmospheric air as it is directed toward the plurality of fuel cells.

7. The portable fuel cell power device of claim 6, wherein the seal plate further includes a thermally conductive medium to facilitate the transfer of heat away from the plurality of fuel cells.

8. The portable fuel cell power device of claim 7, wherein the seal plate further includes a non-planar surface placed proximate to the flow of atmospheric air.

9. The portable fuel cell power device of claim 1, wherein the fuel storage container further includes a secondary metal hydride to retain fuel.

10. The portable fuel cell power device of claim 1, wherein the fuel storage container further includes an outer surface and a porous, thermally conductive material proximate to said outer surface.

11. The portable fuel cell power device of claim 1, further including a housing having a cavity therein, wherein the cavity within the housing provides, at least in part, the fuel reservoir.

12. The portable fuel cell power device of claim 1, wherein the fuel reservoir is a collapsible bladder.

13. The portable fuel cell power device of claim 1, further including a housing having a cavity therein, wherein the fuel reservoir includes the cavity, and wherein the plurality of fuel cells are disposed within the housing.

14. The portable fuel cell power device of claim 1, further including a fan or blower to direct atmospheric air toward the plurality of fuel cells during operation of the portable fuel cell power device.

15. The portable fuel cell power device of claim 1, further including a housing having a cavity therein, wherein the fuel reservoir includes the cavity, and wherein the plurality of fuel cells and the pressure regulator are disposed within the housing the flow of fuel from the fuel reservoir.

16. The portable fuel cell power device of claim 1, further including:
   an air moving device to direct atmospheric air toward a cathode end of each of the plurality of fuel cells; and
   a condensation collection plate positioned within the flow of atmospheric air from the air moving device, wherein the condensation collection plate accumulates moisture from the atmospheric air.

17. The portable fuel cell power device of claim 16, wherein the condensation collection plate includes a plurality of holes therethrough, the plurality of holes each being sized to control the backpressure of the atmospheric air proximate to the plurality of fuel cells.

18. The portable fuel cell power device of claim 17, further including a filter placed proximate to the plurality of holes to remove impurities from the atmospheric air.

19. The portable fuel cell power device of claim 1, further including: an air moving device to direct atmospheric air toward a cathode end of each of the plurality of fuel cells; and a cover, surrounding the plurality of fuel cells, to direct an amount of atmospheric air from the air moving device toward the fuel storage container.

20. The portable fuel cell power device of claim 1, further including an air moving device to direct atmospheric air toward the cathode end of each of the plurality of fuel cells, wherein the air moving device includes a filter to remove impurities from the atmospheric air.

* * * * *